United States Patent [19]

Zielinski

[11] Patent Number: 4,870,628
[45] Date of Patent: Sep. 26, 1989

[54] MULTIPULSE ACOUSTIC MAPPING SYSTEM

[75] Inventor: Adam Zielinski, Victoria, Canada

[73] Assignee: University of Victoria, Victoria, Canada

[21] Appl. No.: 214,922

[22] Filed: May 12, 1988

Related U.S. Application Data

[63] Continuation of Ser. No. 880,596, Jun. 30, 1986, abandoned.

[51] Int. Cl.⁴ ............................................. G01S 15/89
[52] U.S. Cl. ....................................... 367/88; 367/103
[58] Field of Search ................... 367/88, 99, 103, 105; 342/25, 191, 13

[56] References Cited

U.S. PATENT DOCUMENTS 3,928,839 12/1975 Warner et al. ...................... 367/105
4,400,803 8/1983 Spiess et al. ........................... 367/88

Primary Examiner—Thomas H. Tarcza
Assistant Examiner—Daniel T. Pihulic
Attorney, Agent, or Firm—Fetherstonhaugh & Co.

[57] ABSTRACT

An oceanographic mapping system comprises a narrow beam acoustic transmitting transducer, a beam scanning system and controls for controlling the timing of the transmitted pulses and the movement of the bearing scanner. A receiver is also provided to receive the echoes generated by the acoustic pulses and a range calculated as provided for determining the delay between the transmitted pulses and their corresponding echoes. A mapping system is also provided which communicates with the range calculator and the beam scanner and is operable to process the range and bearing signals that generate the profile of the target area. The method of mapping includes the step of transmitting a series of acoustic signals before the first echo generated by a signal of the transmitted series is received by the receiver, thereby to increase the speed at which mapping can be accomplished.

5 Claims, 2 Drawing Sheets

MULTIPULSE ACOUSTIC MAPPING SYSTEM

This application is a continuation of application Ser. No. 880,596, filed June 30, 1986, now abandoned.

This invention relates to improvements in oceanographic mapping systems.

In particular, this invention relates to an improved method of oceanographic mapping which greatly increases the speed with which mapping can be accomplished.

Prior Art

Conventionally, mapping of a target area is accomplished by transmitting an acoustic pulse toward a target area and receiving the reflected echo and determining the distance to the target area based on the bearing of the pulse and the pulse transmission time. The sequence of events is such that when an acoustic pulse is emitted, transmission of the next pulse is delayed until the echo of the transmitted pulse has been received or the delay time is sufficient to ensure that the range of the transmitted pulse is greater than the maximum range of the target area to be mapped. Due to the relatively low velocity of sound propagation in water and the number of measurements required, this type of scanning process is very time consuming. In addition, with these known systems, it is difficult to maintain the scanning head in a stationary position during the mapping process or to establish proper reference points.

SUMMARY OF INVENTION

I have found that it is possible to considerably reduce the mapping time by transmitting a series of acoustic signals before the echo generated by a signal of this series is received by the receiver. That is to say rather than delay the transmission of successive signals until the preceding signal is received, I transmit a series of signals and then delay the transmission of the subsequent series until the signals of the previously transmitted series have been received.

It is an object of the present invention to reduce the time required to generate an oceanographic map by transmitting a series of acoustic signals toward the target area before the first echo generated by a signal of the series of signals is received by the receiver.

According to one aspect of the present invention, there is provided a method of oceanographic mapping wherein a target area is scanned by a narrow beam acoustic transducer within a predetermined angular sector as the transducer is advanced in a predetermined direction and wherein a sequence of acoustic pulses are transmitted, one at each of a series of angularly spaced points within said angular sector and wherein a receiver receives a sequence of echos from the target area corresponding to the transmitted sequence, and the delay between a pulse transmission and the receipt of its echo is a measure of the range of the target area the improvement wherein, a series of acoustic signals is transmitted before the first echo generated by a signal of said series of signals is received by the receiver thereby to increase the speed at which mapping may be accomplished.

BRIEF DESCRIPTION OF THE DRAWINGS

The invention will be more clearly understood after reference to the following detailed specification read in conjunction with the drawings wherein;

With reference to FIG. 1 of the drawings, the reference numeral 10 refers generally to a "fish" which is towed by a vessel 12 at a predetermined depth in a body of water 14 for the purposes of mapping the bottom 16 of the bed of the body of water. The fish 10 is of any conventional construction such as that commonly used for oceanographic mapping purposes. The fish 10 supports a narrow beam acoustic transmitting transducer 18 and a broad-beam receiver 20.

The narrow-beam transmitter may be a conventional narrow beam transmitter of the type commonly used for oceanographic mapping which has a beam width of 1° to 15° and similarly the receiver 20 may be a conventional broad beam receiver.

The transmitter 18 has a scanning sector extending through the angle $\Omega$. In use, the narrow beam 22 which is emitted by the transmitter 18 scans the target area 24 by sequentially emitting a series of pulses P1, P2, P3–PX while scanning the full sector. The scanning can be achieved by mechanically redirecting the output of the transmitter or by an electronic scanning system or the like.

As previously indicated, it is common to map a target area by emitting a pulse from a transmitter and thereafter indexing the transmitter to a second position of a scan, receiving the emitted pulse and thereafter emitting a subsequent pulse and repeating this process for each of several bearing settings of the transmitter as it scans the target area.

Figure 3:
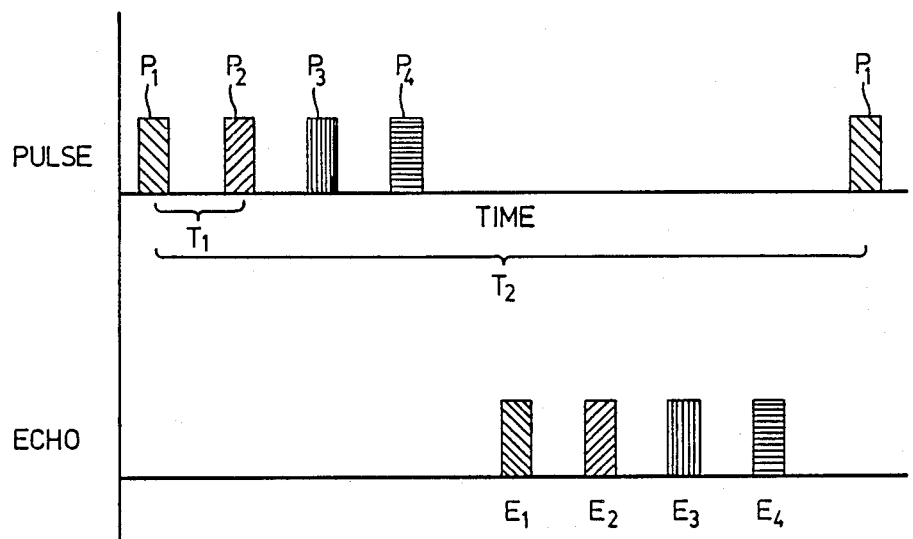
FIG. 3 is a diagram illustrating the timing of a typical series of pulse transmissions and the receipt of their respective echo signals.

The multipulse system of the present invention is illustrated diagramatically in FIG. 3 of the drawings wherein it will be seen that a series of pulses P1, P2, P3 and P4 are emitted at time spaced intervals and the last pulse P4 of the series is transmitted before the first echo E1 is received by the receiver and similarly the last echo E4 is received by the receiver before the next pulse P1 of the next series of pulses is initiated.

I have found that rather than following the procedure wherein the pulse P1 is emitted and the echo E1 is received before the pulse P2 is emitted, I can emit a series of pulses and provided the last pulse of the series is emitted before the first echo E1 of the echo series is received, it is possible to greatly increase the speed of the mapping process.

Because variations in the terrain of the target area will result in variations in the two-way transmission time between the emission of a pulse and the receipt of its echo, I space the acoustic pulses of each of the series of pulses from one another by a time T1 which is known to be sufficient to ensure that the sequence in which the echos E1, E2, E3, etc., are received, is the same as the sequence in which the corresponding pulses are transmitted. This objective can be easily achieved in circumstances where the profile of the target area is approximately known or can be predicted. In circumstances where reasonably accurate prediction cannot be made, the timing can be adjusted in use to achieve this objective.

In order to determine the range of a target area, it is necessary to know the two-way travel time of each pulse and the bearing of each pulse. Clearly the travel time of the pulse which is emitted at the outer most end of the scan will be greater than the travel time of the pulse emitted vertically downwardly in circumstances where the target area is flat. If, however, the travel time and bearing of the pulse is known, it is a simple matter to calculate the actual depth. For a given received echo, the bearing of the corresponding transmitted pulse can be determined by assuming that the echoes will arrive in the same order as corresponding pulses were transmitted as described earlier. In addition, it is possible to distinguish successive acoustic pulses within a series of pulses by ensuring that the frequency of adjacent pulses is distinctly different from one another.

While the pulses within each series of pulses may each have a different frequency, it is possible to distinguish the pulses within any one series merely by employing pulses which have two different frequencies and thereby permitting nonadjacent pulses to have the same frequency. In these circumstances, the pulses which have the same frequency are sufficiently spaced from one another to ensure that their echos are received in the order in which they are transmitted.

Figure 1:
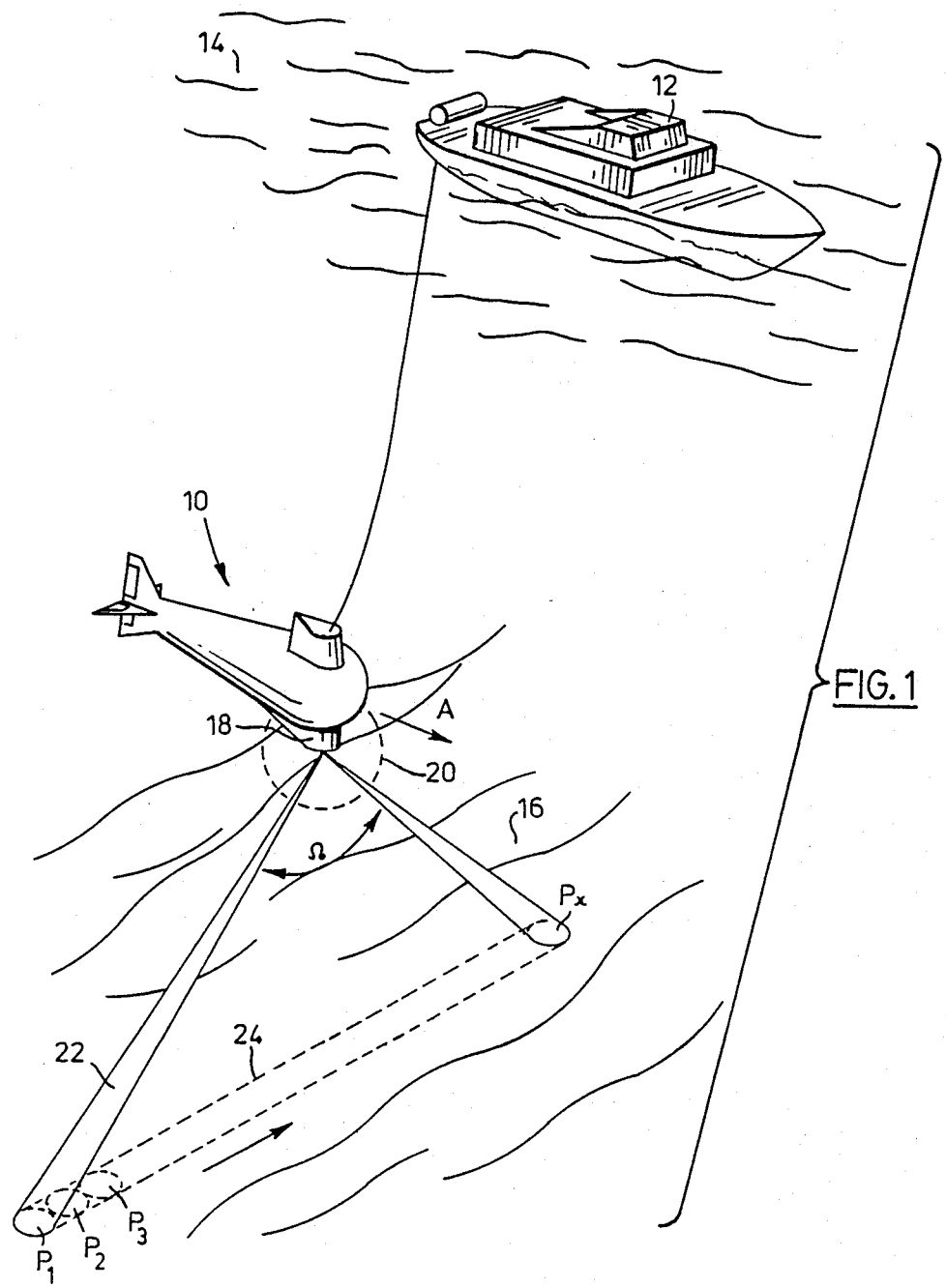
FIG. 1 is a diagram illustrating a towed multipulse device constructed in accordance with an embodiment of the present invention.
Figure 2:
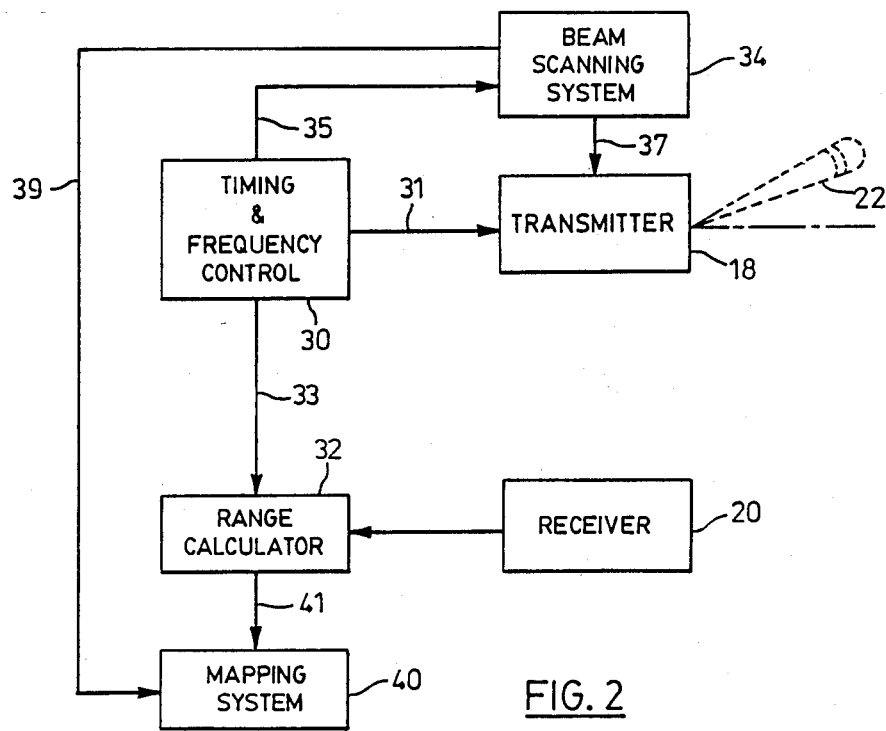
FIG. 2 is a block diagram of a multipulse system according to an embodiment of the present invention.

With reference to FIG. 2 of the drawings, it will be seen that an oceanographic mapping system according to an embodiment of the present invention, comprises the transmitter 18 and receiver 20 previously described. The transmitter 18 emits acoustic pulses, the timing of which is determined by a timing and frequency control device 30. A timing signal is transmitted from the timing and frequency control 30 through the line 31 to the transmitter 18. The timing and frequency control 30 serves to control the timing of successive pulses and the frequency of the pulse which is transmitted. A timing signal is also transmitted through the line 33 to a range calculator 32. A further timing signal is transmitted through the line 35 to the beam scanning system 34. A signal is transmitted from the beam scanning system through the line 37 to the transmitter 18 which serves to adjust the bearing of the transmitter between successive pulses. A corresponding bearing signal is transmitted through the line 39 to a mapping system 40. The mapping system 40 also receives a range signal from the range calculator through the line 41. The mapping system 40 may be adapted to provide any required mapping format.

It will be apparent that the mapping system of the present invention can be used for the purposes of mapping the profile of a surface which extends in a plane other than the plane of the bottom of the body of water. For example, the device of the present invention can be used for mapping the profile of an iceberg simply by reorienting the transmitter to transmit pulses in a direction toward the submerged iceberg.

It will also be apparent that in some circumstances, the two-way travel time of one or more of the pulses of a series of pulses may be greater than the delay time T2 between the initiating pulse of each series of pulses. Where, for example, the pulse P2 is directed into a very deep chasm, the echo E2 might not be received within the time period T2. In these circumstances, the receiver can be readily adapted to disregard the echo E2 when it is received.

If in use it is found that the echo E1 is received before the final pulse P4 of a series of pulses is transmitted, the operator can adjust the timer 30 to reduce the number of pulses in the series or to provide that the time delay T1 between successive pulses is reduced to restore the required timing to ensure that the final pulse P4 of the series is transmitted before the first echo E1 is received.

It will be understood that the number of pulses in any one series may be varied depending upon the anticipated time delay between transmission of the first pulse and the receipt of the corresponding echo. It is anticipated that substantially more than 4 pulses will be transmitted in any one series and only 4 pulses have been illustrated in FIG. 3 in order to simplify the description of the timing sequence and not for the purposes of limiting the scope of the invention.

Various modifications of this invention will be apparent to those skilled in the art without departing from the scope of the invention.

I claim:

1. In a method of oceanographic mapping wherein the range and bearing of target area is determined by scanning the target area, by means of a narrow beam acoustic transducer having beam width in the range of 1° to 15°, within a predetermined angular sector as said narrow beam is advanced in a predetermined direction and wherein a series of acoustic pulses are transmitted, one at each of a series of angularly spaced points within said angular sector and wherein after a delay which is indicative of the range of the target area a receiver receives a series of echos from the target area corresponding to the transmitted series, the improvement of a high speed method of mapping wherein, an assumption is made regarding the maximum bottom depth of the mapping site and thereafter a first sequentially timed series of acoustic signals are transmitted in a predetermined order before the first echo of the sequential series of echos generated by said first sequential series of signals is received by the receiver and wherein a further sequential series of signals is not transmitted until after the last echo of said sequential signal is received a further sequential series of signals is transmitted.

2. A method as claimed in claim 1, wherein the transducer is intermittently activated such that the acoustic pulses of each of said sequential series of pulses are spaced from one another to ensure that the order in which the echos are received corresponds to the order in which the pulses were transmitted.

3. A method as claimed in claim 1, wherein the frequency of successive acoustic pulses within each sequential series of pulses are distinctly different from one another and wherein the frequency of each echo which is received is measured and the echoes and pulses of the same frequency are matched with one another in order to determine the range and bearing of the target area.

4. A method as claimed in claim 1, wherein, within each sequential series of transmitted pulses, nonadjacent pulses have the same frequency and said pulses of the same frequency are sufficiently spaced from one another to ensure that their corresponding echos are received in the order in which the pulses are transmitted.

5. An oceanographic mapping system for determining the bearing and range of a target area, comprising:
(a) a narrow beam acoustic transmitting transducer having a beam width in the range of 1° to 15° and which is operable to emit a first sequential timed series of acoustic pulses, within a predetermined angular bearing sector,
(b) beam scanning means communicating with the transmitter and operable to change the bearing of the beam between successive pulses, (c) receiver means operable to receive an echo generated by each acoustic pulse and to precondition the received echoes, (d) control means communicating with the transmitter to cause it to emit a first series of sequentially timed pulses at predetermined timed intervals which terminate before the first echo of the sequential series of echos generated by the first sequential series of pulses is received by the receiver means and to prevent the transmission of a further sequential series of pulses until the last echo of said first series of pulses is received by the receiver means, (e) range calculator means communicating with the receiver and control means and operable to determine the delay between the transmitted pulses and their corresponding echoes, (f) mapping means communicating with the range calculator to receive a series of range signals and communicating with the beam scanning means to receive a corresponding series of bearing signals and being operable to process the range and bearing signals to generate a profile of the target area.

* * * * *